US006931657B1

(12) United States Patent
Marsh

(10) Patent No.: US 6,931,657 B1
(45) Date of Patent: Aug. 16, 2005

(54) METHODS AND ARRANGEMENTS FOR PROVIDING A NOVEL TELEVISION AND MULTIMEDIA VIEWING PARADIGM

(75) Inventor: David J. Marsh, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/557,047

(22) Filed: Apr. 21, 2000

(51) Int. Cl.$^7$ ............................................. H04N 5/445
(52) U.S. Cl. .......................... 725/46; 725/58; 725/142; 386/83; 386/95
(58) Field of Search .............................. 725/39, 46, 58, 725/141–142, 133–134, 153; 386/83, 46, 386/125–126, 95

(56) References Cited

U.S. PATENT DOCUMENTS

| 5,805,763 A | 9/1998 | Lawler et al. | |
|---|---|---|---|
| 6,324,338 B1 * | 11/2001 | Wood et al. | 386/83 |
| 6,581,207 B1 * | 6/2003 | Sumita et al. | 725/46 |

FOREIGN PATENT DOCUMENTS

| EP | 0 940 985 | | 8/1999 | |
|---|---|---|---|---|
| WO | WO 92/22983 | * | 12/1993 | H04N 5/781 |
| WO | 96/27840 | | 9/1996 | |

* cited by examiner

Primary Examiner—Vincent Boccio
(74) Attorney, Agent, or Firm—Lee & Hayes, PLLC

(57) ABSTRACT

Improved methods and arrangements are provided for use in selecting candidate television and multimedia programs for recording, recording the candidate programs, viewing the recorded programs, and archiving the recorded programs. At the center of this capability is a time-dependent content buffering arrangement that allows candidate programs to be selected by an intelligent content agent, with the assistance of a bubbling agent, an electronic program guide, a select library listing, and/or a personal profile associated with a particular user. The buffering arrangement selectively records candidate programs in a non-circular manner. Candidate programs may be dropped during recording based on certain information associated with the program. For example, examination of closed captioning information may reveal that the candidate program does not match the initial criteria for making it a candidate program. The buffering arrangement also allows the user to selectively view recorded programs on demand and/or archive certain programs. Archived programs are maintained locally or otherwise stored to another media. Those recorded programs that are not archived will be erased in a time-dependent manner when a defined storage capacity is reached. The buffering arrangement also provides for feedback to various intelligent candidate-selecting agents, such as, e.g., an intelligent content agent and a bubbling agent.

36 Claims, 3 Drawing Sheets

METHODS AND ARRANGEMENTS FOR PROVIDING A NOVEL TELEVISION AND MULTIMEDIA VIEWING PARADIGM

TECHNICAL FIELD

This invention relates to computers and software, and more particularly to methods and arrangements for providing a novel television and multimedia viewing paradigm that includes selectively identifying televised information by content, selectively storing televised information, and/or selectively viewing televised information.

BACKGROUND

Given the recent proliferation of television (TV) channels, viewers are quickly migrating towards the use of Electronic Program Guides (EPGs) with the hope of narrowing the list of available channels/programs somewhat. An EPG typically provides information about the content of the programs on each channel and transmission times. Thus, the viewer is allowed to select between channels and programs to fit their needs.

Certain programs, however, may be televised at a time that conflicts with the viewer's own schedule, or with the broadcasting of another program of interest. When this occurs, viewers may choose to videotape or otherwise record the desired program and view it at a later, more convenient time. To accomplish this recording task, viewers need to be able to properly configure the recording device, be it a videocassette recorder (VCR) or videodisc recorder. This typically requires identifying the channel, the program to be recorded and/or the time period for recording the channel. Many improvements have been made to the recording devices and the broadcasting devices to further simplify this recording task.

There is currently a move towards a more personalized television environment in which viewers are allowed to view selected programming on demand. Set top boxes (e.g., computers) are being developed that support this type of enhanced viewing capability.

Current implementations, such as, for example, TiVo, available from TiVo Inc. of San Jose, allow the viewer to record TV programs, rewind and fast forward like a VCR. However, since these set-top boxes store the recorded programming as digital data on a hard disk drive, there are other features provided to further enhance the viewer's control. By way of example, the set-top box can be programmed to automatically record the program being watched, thereby making it possible to pause the program, view the program frame by frame in slow-motion, or provide for an instant replay capability. These set top boxes can further be programmed to record selected programs based on their titles as listed in the EPG. Thus, selected episodes can be recorded regardless of the actual broadcast time. Additionally, these set-top boxes provide a user interface through which the user is able to select recorded programs to view on demand.

Unfortunately, these conventional devices tend to be relatively unsophisticated in that they only record user definable programs and/or service provider suggested channels. Moreover, these devices employ circular buffering techniques, wherein programs are recorded to a hard drive, stored for a specified period of time, and then erased (viewed or not) to make room for a later recorded program.

Consequently, it would be useful to have more intelligent and more robust methods and arrangements for recording television programs and other broadcast multimedia content programs.

SUMMARY

Improved methods and arrangements are provided for automatically/intelligently identifying televised information by content. The methods and arrangements allow for selective recording, storage and manipulation of televised information and/or multimedia information. The methods and arrangements also allow for selected portions of the recorded information to be displayed, transported or otherwise output. Thus, in accordance with certain aspects a novel content-viewing paradigm is provided.

The above stated needs and others are met, for example, by a method that includes automatically selecting a candidate program to be recorded, recording content associated with the selected candidate program, and selectively identifying the recorded content within a time-dependent buffer arrangement. In certain implementations, this includes scanning an electronic program guide (EPG) based on definable user selection criteria to identify the candidate program. Different definable user selection criteria can be maintained for a plurality of users. The method may also include monitoring user activities associated with the recorded content, and modifying the definable user selection criteria based on the monitored user activities. The method may further include recording a plurality of programs within the time-dependent buffer arrangement in an initial time-ordered sequence, and selectively rearranging one or more of them to produce a modified time-ordered sequence within the time-dependent buffer arrangement. This rearrangement can be manually controlled by the user, or may be automatically conducted, for example, based on a comparison of the recorded content with at least a portion of the definable user selection criteria. The method may further include selectively identifying the recorded content within the time-dependent buffer arrangement with a permanent storage buffer arrangement.

BRIEF DESCRIPTION OF THE DRAWINGS

A more complete understanding of the various methods and arrangements of the present invention may be had by reference to the following detailed description when taken in conjunction with the accompanying drawings wherein.

DETAILED DESCRIPTION

The following sections describe an exemplary general-purpose computer and further exemplary implementations of a set-top box computer appliance within a media system. It should be understood that the various methods and arrangements described herein are not limited to these particular computers, appliances, or systems, but are adaptable to any arrangement of mechanisms that is capable of performing the applicable exemplary functions described herein.

Figure 1:
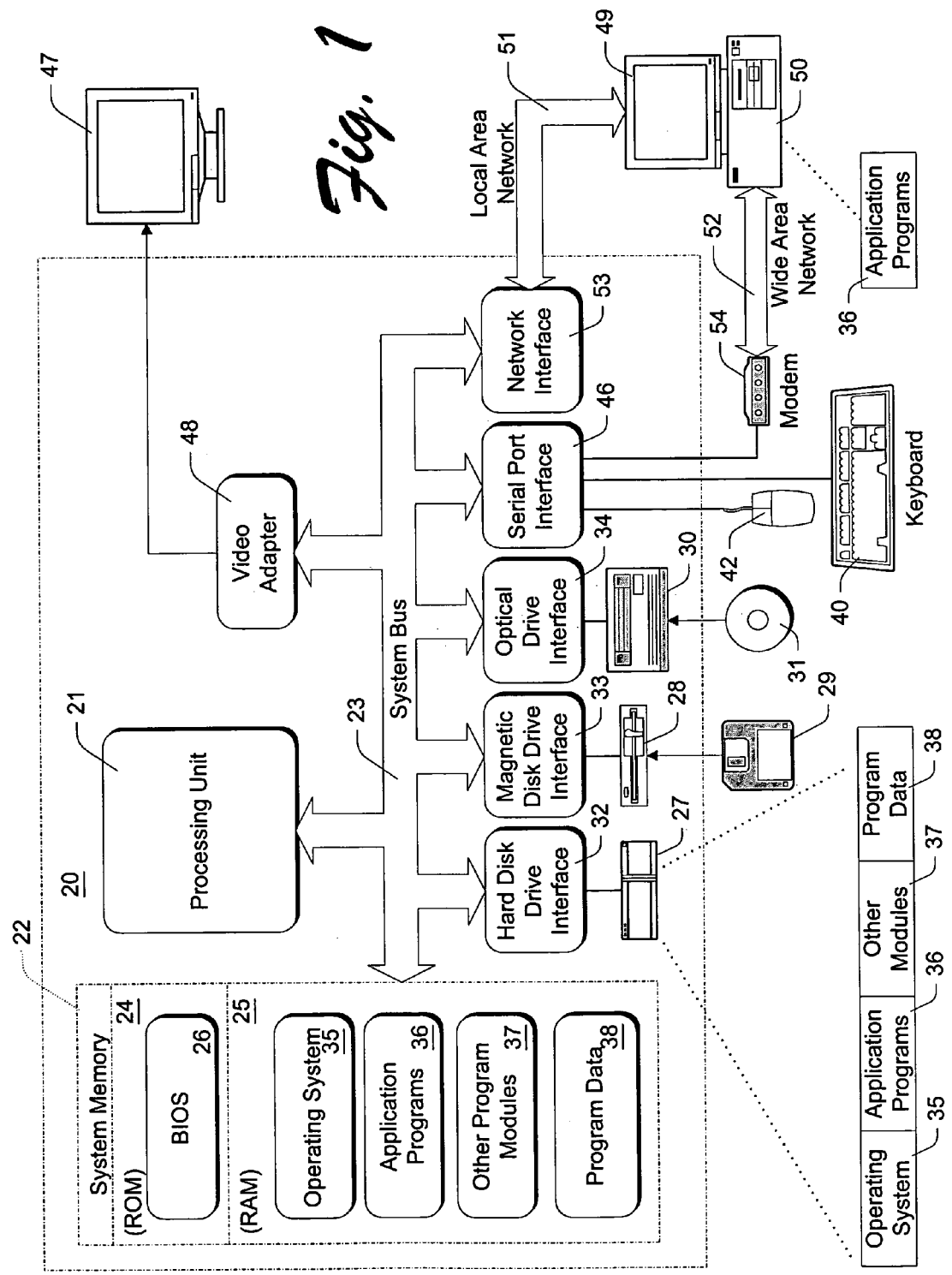
FIG. 1 is a block diagram depicting an exemplary computer.

With this in mind, as shown in FIG. 1, computer 20 includes one or more processors or processing units 21, a system memory 22, and a bus 23 that couples various system components including the system memory 22 to processors 21. Bus 23 represents one or more of any of several types of bus structures, including a memory bus or memory controller, a peripheral bus, an accelerated graphics port, and a processor or local bus using any of a variety of bus architectures.

The system memory includes read only memory (ROM) 24 and random access memory (RAM) 25. A basic input/output system (BIOS) 26, containing the basic routines that help to transfer information between elements within computer 20, such as during start-up, is stored in ROM 24.

Computer 20 further includes a hard disk drive 27 for reading from and writing to a hard disk, not shown, a magnetic disk drive 28 for reading from and writing to a removable magnetic disk 29, and an optical disk drive 30 for reading from or writing to a removable optical disk 31 such as a CD ROM, DVD ROM or other optical media. The hard disk drive 27, magnetic disk drive 28 and optical disk drive 30 are each connected to bus 23 by applicable interfaces 32, 33 and 34, respectively.

The drives and their associated computer-readable media provide nonvolatile storage of computer readable instructions, data structures, program modules and other data for computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, random access memories (RAMs) read only memories (ROM), and the like, may also be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into computer 20 through input devices such as keyboard 40 and pointing device 42. Other input devices (not shown) may include a microphone, joystick, game pad, satellite dish, scanner, or the like. These and other input devices are connected to the processing unit 21 through an interface 46 that is coupled to bus 23.

A monitor 47 or other type of display device is also connected to bus 23 via an interface, such as a video adapter 48. In addition to the monitor, personal computers typically include other peripheral output devices (not shown) such as speakers and printers.

Computer 20 can operate in a networked environment using logical connections to one or more remote computers, such as a remote computer 50. Remote computer 50 may be another personal computer, a server, a router, a network PC, a peer device or other common network node, and typically includes many or all of the elements described above relative to computer 20. The logical connections depicted in FIG. 2 include a local area network (LAN) 51 and a wide area network (WAN) 52. Such networking environments are commonplace in offices, enterprise-wide computer networks, intranets, and the Internet.

When used in a LAN networking environment, computer 20 is connected to the local network 51 through a network interface or adapter 156. When used in a WAN networking environment, computer 20 typically includes a modem 54 or other means for establishing communications over the wide area network 52, such as the Internet. Modem 54, which may be internal or external, is connected to bus 23 via interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Figure 2:
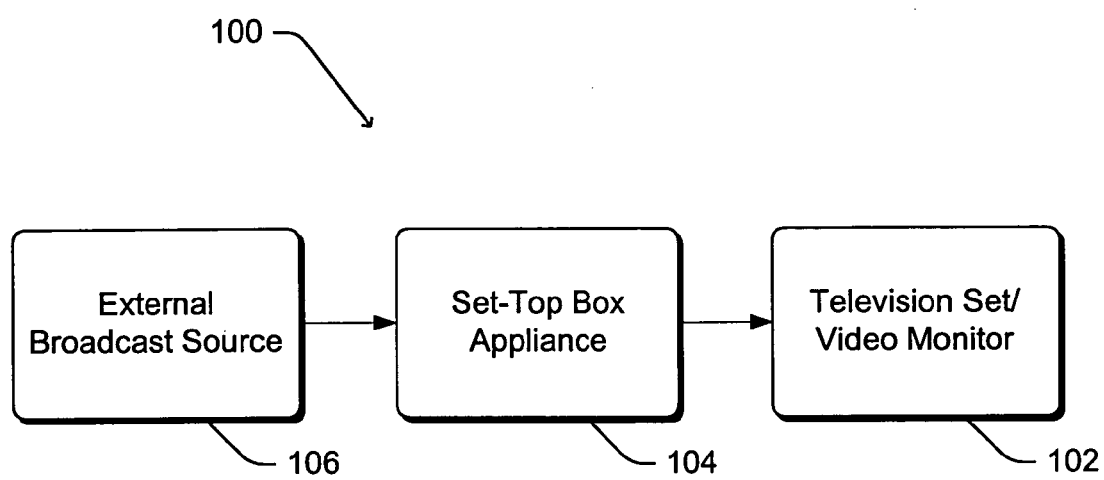
FIG. 2 is a block diagram depicting a media system having a set-top box computer appliance.

FIG. 2 is a block diagram depicting a media system 100 having a television 102 or like monitor device operatively coupled to a set-top box appliance 104. Set-top box 104 can include all or part of personal computer 20. In this example, set-top box 104 is operatively coupled to receive televised information from at least one external broadcast source 106. Set-top box 104 is configured to store MPEG or like forms of received video streams (including audio, and other associated information) to a hard disk and retrieve them whenever required.

In the case of a digital broadcast (e.g., as transmitted over cable/fiber, the Internet, terrestrial, satellite, etc.), the signal is typically broadcast in an MPEG format. Thus, set-top box 104 need only store all or part of the received signal. In the case of an analog broadcast, set-top box 104 encodes the received signal as an MPEG signal or other like signal, thereby converting the analog signal to a corresponding digital signal. It is necessary to have the televised signal in a digital form so that it can be stored to disk. The MPEG format (or other like format) is preferably implemented to provide the requisite compression based on the computational capabilities of the processor and/or the storage capability of the memory and/or storage device/medium.

The ability to record program content in MPEG (or other applicable compressive format) to a hard disk coupled with suitable software provides a potential mechanism for decoupling the viewer's schedule from the broadcaster's schedule.

A TV viewing system, for example, typically has an Electronic Program Guide (EPG) database that identifies what programs are on each TV channel and at what times. Many EPGs also include information about the program content, such as, e.g., title, hosts, stars, guests, synopsis, summary, producer, director, photographer, cinematographer, author, writer, date/time, rating, etc. In accordance with certain implementations, viewers are able to manually search through a user-displayed grid of TV programs and to select candidate programs that are to be recorded for subsequent viewing. This capability is similar to that provided by TiVo and other like devices.

The exemplary improved methods and arrangements provided herein, however, provide several additional capabilities for the viewer. One of the problems with TiVo is that many external broadcasters provide an overabundance of channels and it may take a viewer a great deal of time to search through the EPG, a printed channel guide, etc., to determine what programs to record. A relatively unsophisticated method is also provided to get the system to record additional programs of interest for the viewer, but this clearly does not match the more sophisticated exemplary content buffering schemes presented herein.

Rather than the viewer having to search through the EPG, it would be more convenient to have an intelligent media system or set-top box that automatically suggests several interesting programs/channels, all of which may be of keen interest to the viewer. Set-top box 104 can be configured this way. Consequently, a selected subset of selectable programs/channels is automatically presented to the viewer, for example, using an on-screen display capability.

Figure 3:
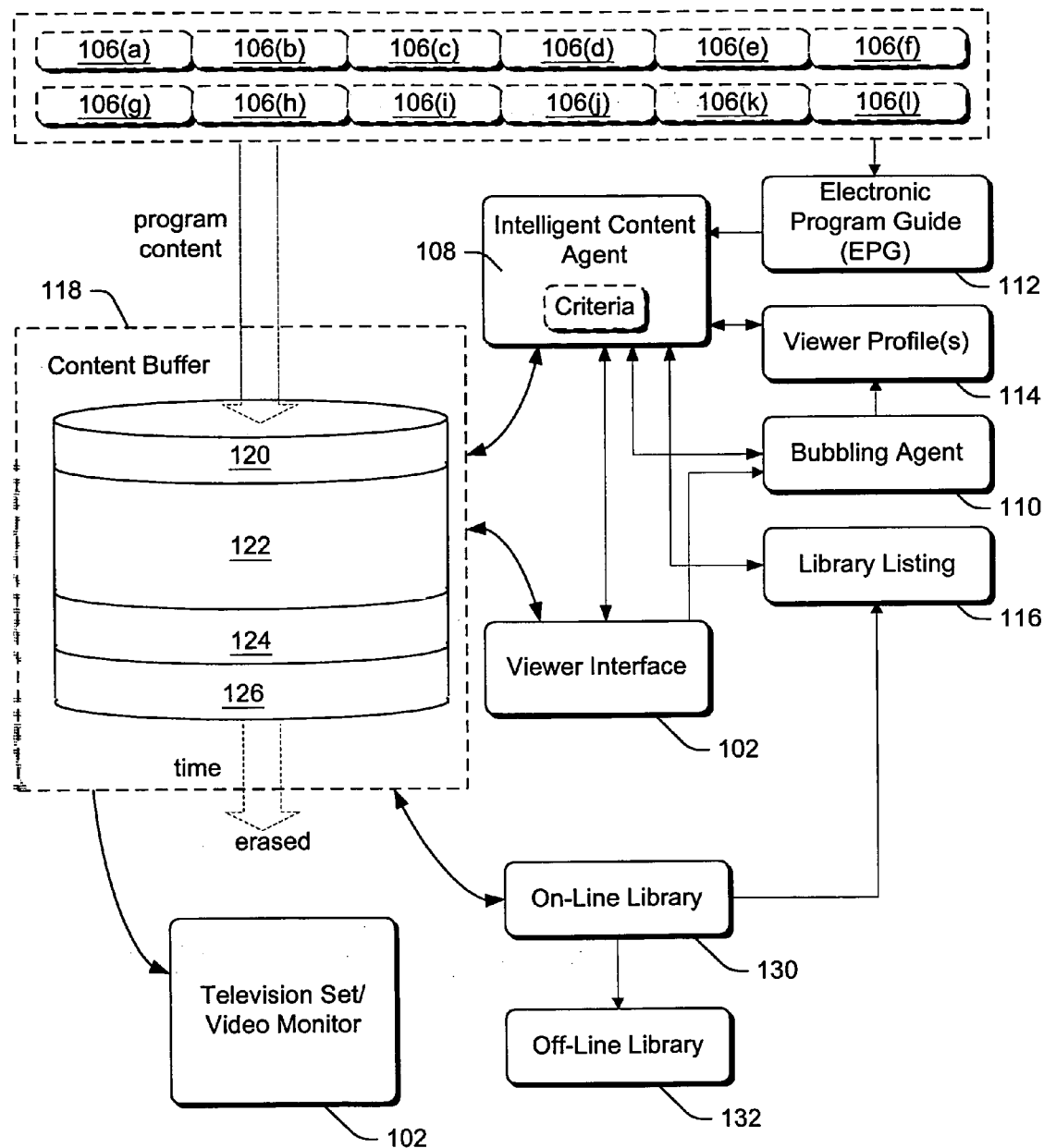
FIG. 3 is an illustrative flowchart graphically depicting the operation of an exemplary set-top box computer appliance, as in FIG. 2.

FIG. 3 is an illustrative block diagram further depicting certain devices/functions associated with set-top box 104. As depicted, set-top box 104 receives broadcast signals from one or more external broadcast sources 106(*a–l*). Here, for example, 106(*a*) includes an analog terrestrial broadcast source, 106(*b*) includes a (digital or analog) cable/fiber broadcast source, 106(*c*) includes a digital terrestrial broadcast source, 106(*d*) includes a telecommunications line broadcasting source, 106(*e*) includes a local transmitting source, 106(*f*) includes a satellite transmitting source, 106(*g*) includes a video optical disc source, 106(*h*) includes a video tape source, 106(*i*) includes a video camera source, 106(*j*) includes a digital camera source, 106(*k*) includes an audio optical source, and 106(*l*) includes a still image source.

The broadcast signals are selectively identified as being candidate programs by an intelligent content agent 108 and using an EPG database 112. Other semi-automatic mechanisms such as an EPG bubbling agent 110 can also be used.

Intelligent content agent 108 is configured to confidentially keep track of the types of programs that a particular viewer watches. This information is maintained in a corresponding viewer profile 114. The information in viewer profile 114 is then used to identify candidate programs, for example, based on similarities in program content entries of EPG database 112.

By way of example, let us assume that the viewer instructs the intelligent content agent 108, for example, through an on-screen user interface and remote control mechanism, that he/she is interested in any televised programs identifiably associated with the actress Ms. Julia Roberts. Given this task, intelligent content agent 108 will monitor information in EPG database 112 for future programs having something to do with Ms. Roberts. Thus, for example, if Ms. Roberts were to appear as a guest on the next episode of the Late Show With David Letterman, then intelligent content agent 108 would automatically identify the next episode of the Late Show With David Letterman as a candidate program for recording. Similarly, a motion picture starring Ms. Roberts would also be identified as a candidate program for recording as might also a multimedia broadcast having content about Ms. Roberts. At a later stage, the viewer may further modify intelligent content agent 108 by identifying that he/she is only interested in motion pictures starring Ms. Roberts and not guest appearances on talk shows or other multimedia presentations. For example, the viewer may specify a minimum time period for candidate programs that, in essence, excludes talk shows and the like. Conversely, a maximum time period may also be used to exclude motion pictures.

In still other implementations, the viewer may configure intelligent content agent 108 to expressly include or exclude certain channels and/or certain programs by any identifiable characteristic (content) that can be found in the EPG database. Preferably, intelligent content agent 108 maintains the selection criteria associated with a viewer in a secure manner. For example, the selection criteria can be maintained in an encrypted viewer profile stored on a disk drive or on a smart card or like device that operatively interfaces with the set-top box 104 and/or media system 100.

Bubbling agent 110 is another form of an intelligence that can be provided within set-top box 108. Bubbling agent 110 is configured to modify a viewer's profile information and identify candidate programs for recording by observing how the viewer responds to recorded programs. Thus, for example, bubbling agent 110 can monitor the content of recorded programs and look for patterns or similarities that point towards potential candidate selection criteria for future programming. In the previous examples, therefore, bubbling agent 110 may recognize that the viewer has never replayed or archived a recorded program of the Late Show With David Letterman with or without Ms. Roberts as a guest. This being the case, then bubbling agent 110 may decide to modify the viewer's profile accordingly to expressly exclude future broadcasts of the Late Show With David Letterman.

The reverse is also possible, in that bubbling agent 110 may recognize that a viewer appears to like watching Major League Baseball games, for example. In this case, bubbling agent 110 may add selection criteria to the viewer's profile that causes intelligent content agent 108 to select Major League Baseball games as candidate programs for recording in the future.

In addition to EPG database 112 and viewer profile 114, intelligent content agent 108 and/or bubbling agent 110 may also access a select library list 116 that includes identifiable characteristics associated with recorded programs that have been recorded in the past. Thus, for example, bubbling agent 110 may examine information in select library list 116 for program similarities, viewer watching patterns, etc.

Those skilled in the art will recognize that EPG 112 can be provided to set-top box 108 through a variety of communication channels. For example, EPG 112 may be broadcast along with cable television services, terrestrial broadcasting services, satellite services, telecommunication services, network provider services, etc.

Referring once again to FIG. 3, set-top box 104 further includes a time-dependent content buffer arrangement 118. Content buffer arrangement 118 is configured to substantially function as a FIFO content buffer that includes candidate information 120 about candidate programs for recording, one or more recorded program information 122, currently playing program information 124, and previously played program information 126. Content buffer 118 is operatively responsive to a viewer interface 128. Content buffer 118 is also operatively configured to selectively output information to viewer interface 128, television 102 (or other like device), and an on-line library 130.

In accordance with certain implementations, content buffer 118 is a FIFO (First In First Out) buffer that is essentially a shift register, in this case for content items. Thus, as time advances, the content items within content buffer 118 also advance and eventually pass through the pipe as graphically depicted in FIG. 3.

Information identifying candidate programs for recording is "loaded" into the top of content buffer 120. This can be via manual means, i.e., using viewer interface 128, the viewer clicks (e.g., using a mouse, a remote control, etc.) on a program in EPG database 112 thereby requesting that the program be recorded. More likely, however, programs will be identified as candidates for recording automatically, as described above.

Based on candidate information 120, when a candidate program to be recorded is broadcast it will be recorded. The resulting recorded content is included in recorded program information 122. Viewer interface 128 is configured to present the viewer with a listing of recorded programs within recorded program information 122 that have not been viewed.

If the viewer does nothing, then the programs will be played back in the order in which they were recorded when the media system was turned on and in a sequencer content buffer mode. After a program has been watched by the viewer, the program's contents are moved into previously played program information 126. Eventually, if the user does nothing, the program content in previously played program information 126 will be automatically erased (or otherwise overwritten) to provide disk space for recording more recent candidate programs.

Since, in this example, content buffer 120 is a FIFO by default information is moved through the content "pipe" in a linear fashion. Consequently, media system 100 can be used in a default manner to automatically keep a viewer supplied with a constant stream of programs that more closely match their preferences.

Moreover, intelligent agent 108 and bubbling agent 110 may utilize a feedback mechanism such as a viewer profile 114 or library list 116 to refine the candidate program selection process or moderate the recording of programs. For example, the feedback mechanism may be based on how quickly content in recorded program information 122 is watched by the viewer. If the content is being watched quickly then intelligent content agent 108 may not be as selective about which programs it selects as candidate programs to record.

In certain implementations, the viewer is allowed to proactively and/or dynamically manage the contents of content buffer 118 and viewer profile 114. Through viewer interface 128, for example, the viewer can choose to selectively edit a list of candidate programs to be recorded. This is especially useful in the beginning when many of the programs automatically selected by intelligent content agent 108 may not actually be of interest to the viewer. Intelligent content agent 108 can become more refined in its candidate program selection capability after bubbling agent 110 begins to assist, and/or it "learns" the programs that the user keeps deleting, and therefore stops selecting them as candidates.

A more frequent managing function will be for the viewer to examine a list of recorded programs and to select which recorded programs ones to watch. Here, the viewer may decide to discard some of the recorded programs without watching them. Some of the recorded programs may remain recorded program information 122 for a while as the viewer selectively moves other recorded programs in front of them to configure a particular viewing sequence.

In certain implementations, intelligent content agent 108 may automatically delete a recorded program from content buffer 118, even though there is no shortage of storage space therein. For example, intelligent content agent 108 may monitor the closed caption text or like supplemental information associated with a program while its being recorded or after it has been recorded. Thus, in the earlier example of Ms. Roberts appearing on the Late Show With David Letterman, intelligent content agent 108 may be configured to monitor the closed caption text for certain terms. Hence, for example, should Ms. Roberts or Mr. Letterman fail to mention "Major League Baseball" during the program then intelligent content agent 108 may decide to delete the recorded program entirely. Similarly, intelligent content agent 108 may be configured to automatically select a particular program/channel as a candidate program for recording and monitor a separate audio program for English translation (e.g., using textual outputs from an applicable English language voice recognition application). If the recorded program/channel does not include English text, then the recorded program/channel may be automatically deleted.

In the exemplary media system 100 as depicted in FIG. 3, the viewer may choose to have a particular recorded program archived in library 130. Programs in library 130 are not deleted from hard disk unless the viewer specifically decides to delete them. In practice, it is expected however that the viewer will need to do some clean-up/deleting for disk space usage reasons, but at least the viewer has full control of the process. Archiving is accomplished through viewer interface 128.

In this manner, with regard to program content a single hard disk has two different portions. The first portion includes a time-dependent content buffer 118 and the second portion includes a permanent storage library 130.

In certain implementations, recorded content in content buffer 118 can be moved quickly/dynamically to library 130 by the viewer. For example, when watching a recorded program, i.e., when media system 100 is in the sequencer mode, the viewer can initiate a 'Record' mechanism control that causes the recorded program to be archived to library 130. It is also possible to archive a recorded program from previously played program information 126 to library 130, assuming of course that the recorded program has not yet been erased to free up disk space.

Archived programs in library 130 can be further transferred to an offline library 132, e.g., a conventional removable recording media, such as, a digital or analog VHS/S-VHS, optical disc, DAT, etc.

Although some preferred embodiments of the various methods and arrangements of the present invention have been illustrated in the accompanying Drawings and described in the foregoing Detailed Description, it will be understood that the invention is not limited to the exemplary embodiments disclosed, but is capable of numerous rearrangements, modifications and substitutions without departing from the spirit of the invention as set forth and defined by the following claims.

What is claimed is:

1. A method comprising:
   automatically selecting a candidate program to record;
   identifying the candidate program in a first part of a time-dependent buffer arrangement, to provide candidate information;
   recording content associated with the selected candidate program;
   identifying the recorded content in a second part of the time-dependent buffer arrangement, to provide recorded program information, wherein the candidate information and the recorded program information define program-related information;
   wherein the program-related information advances through the time-dependent buffer arrangement in the manner of a shift register, wherein an order of program-related information in the time-dependent buffer arrangement defines a temporal order for presenting programs corresponding to the program-related information to a viewer; and
   presenting a stream of programs to the viewer based on the temporal order identified by the time-dependent buffer arrangement.

2. The method as recited in claim 1, wherein the automatically selecting of the candidate program further includes:
   scanning an electronic program guide (EPG) based on definable user selection criteria to identify the candidate program.

3. The method as recited in claim 2, further comprising:
   maintaining definable user selection criteria for each one of a plurality of users.

4. The method as recited in claim 2, further comprising:
   monitoring user activities associated with the recorded content; and
   modifying the definable user selection criteria based on the monitored user activities.

5. The method as recited in claim 2, further comprising:
identifying a plurality of recorded content corresponding to respective candidate programs within the time-dependent buffer arrangement to provide a corresponding plurality of recorded program information, wherein the plurality of the recorded program information is in an initial time-ordered sequence for viewing the recorded content; and
selectively rearranging the initial time-ordered sequence of the plurality of the recorded program information to produce a modified time-ordered sequence for viewing the recorded content within the time-dependent buffer arrangement.

6. The method as recited in claim 5, wherein the initial time-ordered sequence is automatically rearranged based on a comparison of the recorded program information with at least a portion of the definable user selection criteria.

7. The method as recited in claim 5, wherein the initial time-ordered sequence is manually rearranged based on user inputs.

8. The method as recited in claim 5, wherein the modified time-ordered sequence differs from the initial time-ordered sequence by moving at least some recorded program information in front of other recorded program information.

9. The method as recited in claim 1, further comprising:
selectively identifying the recorded content within the time-dependent buffer arrangement with a permanent storage buffer arrangement.

10. The method as recited in claim 1, further comprising:
playing the recorded content identified in the second part of the time-dependent buffer arrangement, to provide previously played program information; and
identifying the previously played program information in a third part of the time-dependent buffer arrangement.

11. The method as recited in claim 1, wherein the stream of recorded content is a single stream.

12. A computer-readable medium having computer-executable instructions for performing steps comprising:
automatically selecting a candidate program to record;
identifying the candidate program in a first part of a time-dependent buffer arrangement, to provide candidate information;
recording content associated with the selected candidate program;
identifying the recorded content in a second part of the time-dependent buffer arrangement to provide recorded program information, wherein the candidate information and the recorded program information define program-related information;
wherein the program-related information advances through the time-dependent buffer arrangement in the manner of a shift register, wherein an order of program-related information in the time-dependent buffer arrangement defines a temporal order for presenting programs corresponding to the program-related information to a viewer; and
presenting a stream of programs to the viewer based on the temporal order.

13. The computer-readable medium as recited in claim 12, wherein the automatically selecting of the candidate program further includes:
scanning an electronic program guide (EPG) based on definable user selection criteria to identify the candidate program.

14. The computer-readable medium as recited in claim 13, further comprising computer-executable instructions for:
maintaining definable user selection criteria for each one of a plurality of users.

15. The computer-readable medium as recited in claim 13, further comprising computer-executable instructions for:
monitoring user activities associated with the recorded content; and
modifying the definable user selection criteria based on the monitored user activities.

16. The computer-readable medium as recited in claim 13, further comprising computer-executable instructions for:
identifying a plurality of the recorded content corresponding to respective candidate programs within the time-dependent buffer arrangement to provide a corresponding plurality of recorded program information, wherein the plurality of the recorded program information is in an initial time-ordered sequence for viewing the recorded content; and
selectively rearranging the initial time-ordered sequence of the plurality of the recorded program information to produce a modified time-ordered sequence for viewing the recorded content within the time-dependent buffer arrangement.

17. The computer-readable medium as recited in claim 16, wherein the initial time-ordered sequence is automatically rearranged based on a comparison of the recorded program information with at least a portion of the definable user selection criteria.

18. The computer-readable medium as recited in claim 16, wherein the initial time-ordered sequence is manually rearranged based on user inputs.

19. The computer-readable medium as recited in claim 16, wherein the modified time-ordered sequence differs from the initial time-ordered sequence by moving at least some recorded program information in front of other recorded program information.

20. The computer-readable medium as recited in claim 12, further comprising computer-executable instructions for:
selectively identifying the recorded content within the time-dependent buffer arrangement with a permanent storage buffer arrangement.

21. The computer-readable medium as recited in claim 12, further comprising computer-executable instructions for:
playing the recorded content identified in the second part of the time-dependent buffer arrangement, to provide previously played program information; and
identifying the previously played program information in a third part of the time-dependent buffer arrangement.

22. An arrangement comprising:
an intelligent content agent configured to automatically select a candidate program to record;
a time-dependent content buffer mechanism operatively coupled to the intelligent content agent and configurable to:
identify the candidate program in a first part of the time-dependent buffer mechanism, to provide candidate information, wherein the recording of the candidate program produces recorded content; and
identify the recorded content in a second part of the time-dependent buffer mechanism to provide recorded program information, wherein the candidate information and the recorded program information define program-related information,
wherein the arrangement is configured to advance the program-related information through the time-dependent buffer in the manner of a shift register, wherein an order of program-related information in the time-dependent buffer mechanism defines a temporal order for presenting programs corresponding to the program-related information to a viewer, wherein the arrangement is configured to present a stream of programs to the viewer based on the temporal order identified by the time-dependent buffer mechanism.

23. The arrangement as recited in claim 22, wherein the intelligent content agent is further configured to scan an electronic program guide (EPG) based on definable user selection criteria to identify the candidate program.

24. The arrangement as recited in claim 23, wherein the intelligent content agent is further configured to maintain definable user selection criteria for each one of a plurality of users.

25. The arrangement as recited in claim 23, further comprising a bubbling agent operatively associated with the intelligent content agent and the time-dependent content buffer mechanism, and configured to monitor user activities associated with the recorded content, and modify the definable user selection criteria based on the monitored user activities.

26. The arrangement as recited in claim 23, wherein the time-dependent content buffer mechanism is further configured to:

identify, in an initial time-ordered sequence for viewing the recorded content, a plurality of recorded content associated with a plurality of selected candidate programs to provide a corresponding plurality of recorded program information; and respond to user input by selectively rearranging the initial time-ordered sequence to produce a modified time-ordered sequence for viewing the recorded content.

27. The arrangement as recited claim 26, wherein the modified time-ordered sequence differs from the initial time-ordered sequence by moving at least some recorded program information in front of other recorded program information.

28. The arrangement as recited in claim 23, wherein the time-dependent content buffer mechanism is further configured to:

identify, in an initial time-ordered sequence for viewing the recorded content, a plurality of recorded content associated with a plurality of selected candidate programs to provide a corresponding plurality of recorded program information; and wherein, the intelligent content agent is further configured to automatically rearrange the initial time-ordered sequence based on a comparison of the recorded program information with at least a portion of the definable user selection criteria to produce a modified time-ordered sequence for viewing the recorded content.

29. The arrangement as recited claim 28, wherein the modified time-ordered sequence differs from the initial time-ordered sequence by moving at least some recorded program information in front of other recorded program information.

30. The arrangement as recited in claim 22, further comprising a permanent storage buffer mechanism operatively associated with the time-dependent content buffer mechanism, and wherein the arrangement is further configured to selectively store the recorded content within the permanent storage buffer mechanism.

31. The arrangement as recited in claim 22 wherein the intelligent content agent is further configured to examine closed caption data during recording of the candidate program to determine if the candidate program significantly matches a specific user criteria.

32. The arrangement as recited in claim 22 wherein the time-dependent content buffer mechanism is further configured to automatically provide a selectively arranged sequence of recorded candidate programs.

33. The arrangement as recited in claim 22, wherein the arrangement is configured to play the recorded content identified in the second part of the time-dependent buffer mechanism, to provide previously played program information, and the time-dependent buffer mechanism is further configured to identify the previously played program information in a third part of the time-dependent buffer mechanism.

34. A method comprising:

identifying program information associated with plural programs in a time-dependent buffer arrangement, wherein an order of the program information defines a temporal order in which the programs are presented to a viewer;

presenting a stream of programs to the viewer in the order defined by the time-dependent buffer arrangement by advancing the program information through the time-dependent buffer in the manner of a shift register; and identifying, using the time-dependent buffer arrangement, a status of the program information with respect to whether the corresponding programs have been: (a) selected but not yet recorded; (b) recorded but not yet viewed; and (c) viewed.

35. A computer-readable medium having computer-executable instructions for performing the method of claim 34.

36. An arrangement configured to perform the method of claim 34.

* * * * *